L. R. SCHAAP.
INNER TUBE FOR PNEUMATIC TIRES.
APPLICATION FILED JAN. 28, 1916.
1,203,654.
Patented Nov. 7, 1916.
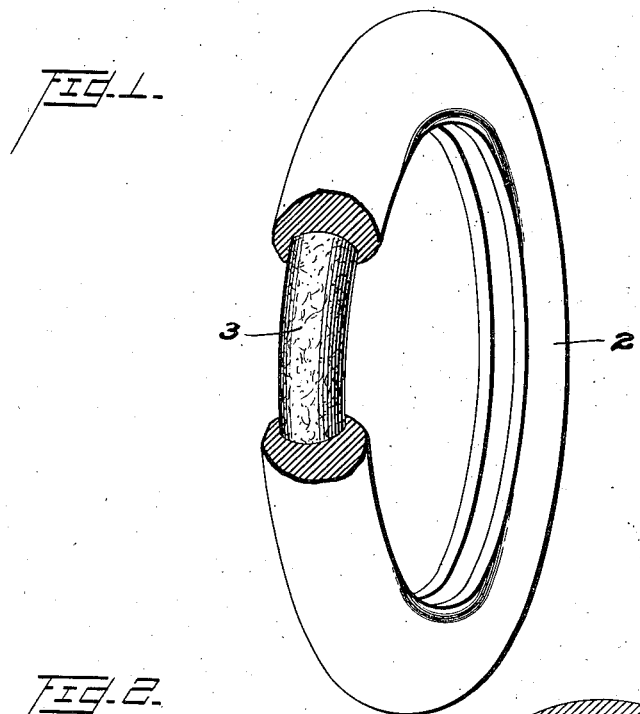
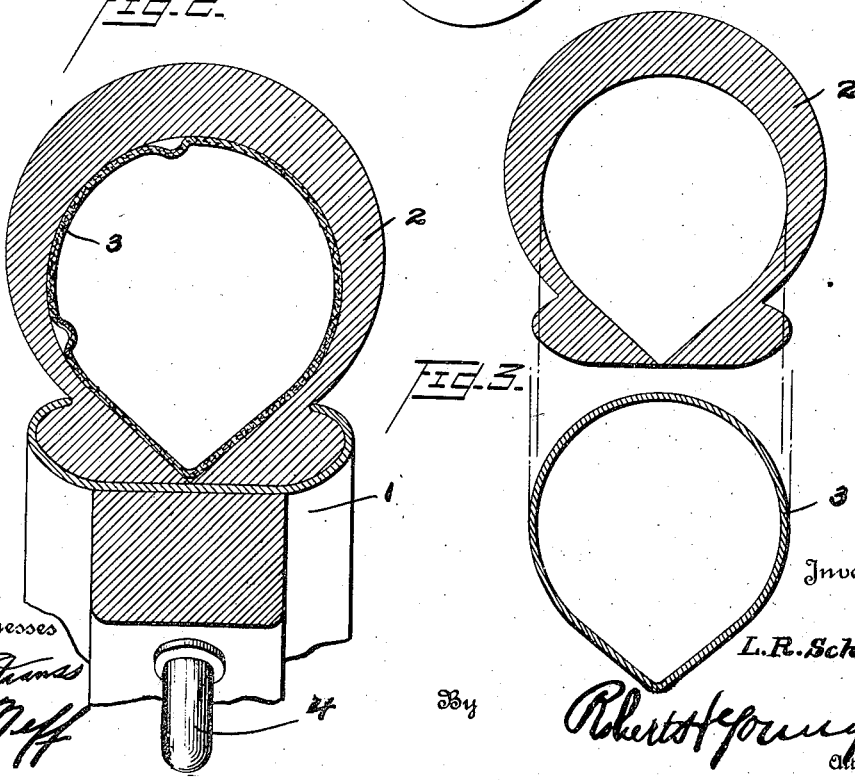
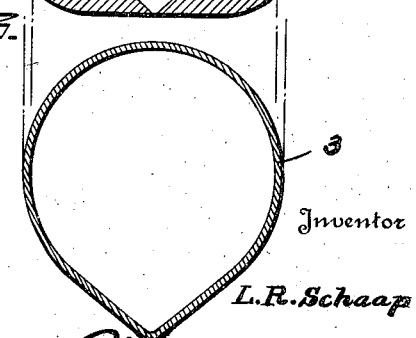

UNITED STATES PATENT OFFICE.

LEIGH R. SCHAAP, OF LONGMONT, COLORADO.

INNER TUBE FOR PNEUMATIC TIRES.

1,203,654.  
Specification of Letters Patent.  
Patented Nov. 7, 1916.

Application filed January 28, 1916. Serial No. 74,725.

*To all whom it may concern:*

Be it known that I, LEIGH R. SCHAAP, a citizen of the United States, residing at Longmont, in the county of Boulder and State of Colorado, have invented certain new and useful Improvements in Inner Tubes for Pneumatic Tires, of which the following is a specification.

My invention relates to the inner tubes of pneumatic vehicle tires.

The object of my invention is to produce a tire of non-elastic material, but which is sufficiently flexible for the purposes of its intended use.

Another object thereof is to produce an inner tube of pneumatic tires, adapted to be inflated for the distention of the outer cover of the tire, made of paper fabric combined with silk or similar fabrics, to be inflated within the outer case.

A further object thereof is to produce an air-tight, flexible and inflatable inner tube of the character described, provided with suitable valves and of slightly greater diameter than the inside diameter of the outer case; and a still further object of my invention is to produce a more simple, cheap and efficient pneumatic tire of the character described than has heretofore been attained.

To these ends my invention includes the material and structural combinations to be hereinafter described and more particularly pointed out in the claim.

In the accompanying drawings, in which like reference characters indicate similar parts, Figure 1 is a perspective view of a vehicle tire of my invention, showing a part of the outer case removed; Fig. 2 is a vertical sectional view of the same; Fig. 3 is a vertical sectional view of the inner tube and outer cover of my vehicle tire disassembled.

Referring more particularly to the drawings, 1 designates the rim of a vehicle wheel, on which is carried the outer case 2 and inner tube 3 of my invention. As the case 2 and parts of the wheel form no part of my invention, they will not be more particularly described.

The tube 3 comprises an annular cylinder of flexible fabric, of which silk or like fabric forms the base and which is commingled and saturated with paper fabric to render same impervious and air-tight. Said tube is preferably larger in diameter and capacity than the inside diameter and capacity of the outer case, whereby when it is inflated through the valve 4, the outer case becomes fully distended before the tube becomes fully stretched to lessen the likelihood of puncturing or bursting the inner tube.

It will be appreciated that the structure of an inner tube of the character and type described would entirely fulfil all of the requirements of the structure of pneumatic tires and that the material of which my invention is made would effect an economy and convenience to the users of such articles.

Having thus described my invention, what I claim as new and desire to be secured by Letters Patent is—

A pneumatic tire, comprising an outer case and an inner tube made of woven fabric saturated with paper fiber, substantially as described.

In testimony whereof I herewith affix my signature in presence of two witnesses.

LEIGH R. SCHAAP.

Witnesses:
J. E. BERG,
GEO. H. SWANN.